June 2, 1925.

W. L. HAINES

CLUTCH

Filed Jan. 15, 1924

INVENTOR.
Wayne L. Haines,
BY
Geo. T. Kimmel.
ATTORNEY.

June 2, 1925.                    1,540,617
W. L. HAINES
CLUTCH
Filed Jan. 15, 1924      2 Sheets-Sheet 2

INVENTOR.
Wayne L. Haines,
BY
Geo. P. Kimmel.
ATTORNEY.

Patented June 2, 1925.

1,540,617

UNITED STATES PATENT OFFICE.

WAYNE L. HAINES, OF MADELIA, MINNESOTA.

CLUTCH.

Application filed January 15, 1924. Serial No. 686,318.

*To all whom it may concern:*

Be it known that I, WAYNE L. HAINES, a citizen of the United States, residing at Madelia, in the county of Watonwan and State of Minnesota, have invented certain new and useful Improvements in Clutches, of which the following is a specification.

This invention relates to the driving mechanism of motor driven vehicles, and has for one of its objects to provide a simply constructed device whereby the drive shaft may be positively and quickly disengaged from the transmission gearing.

With these and other objects in view the invention consists in certain novel features of construction as hereinafter shown and described and then specifically pointed out in the claim, and in the drawings illustrative of the preferred embodiment of the invention—

Figure 1:
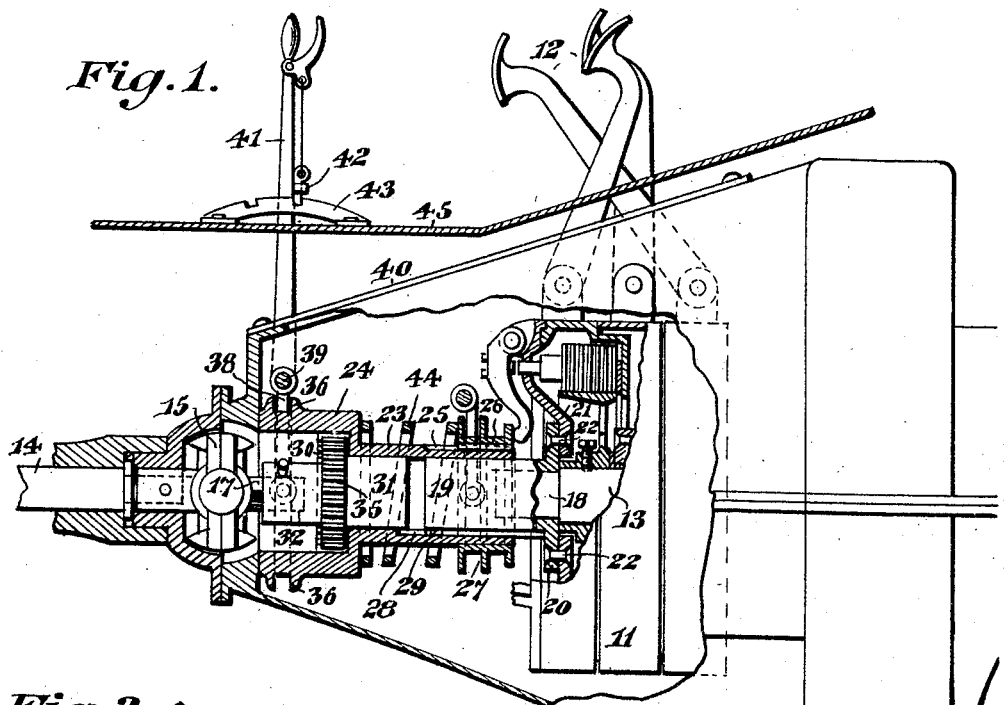
Figure 1 is a longitudinal section of a portion of the driving mechanism of a conventional motor driven vehicle including portions of the transmission gearing, the drive shaft, and the universal joint in the drive shaft, with the improvement applied.
Figure 2:
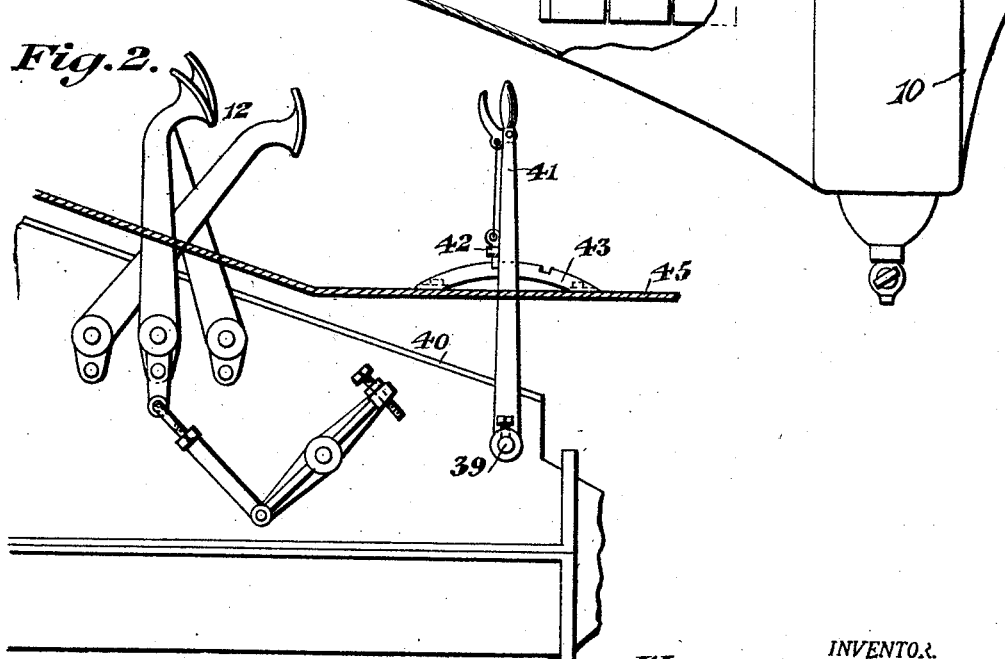
Figure 2 is a side elevation of the levers of the transmission gearing with the operating lever of the improved device.
Figure 3:
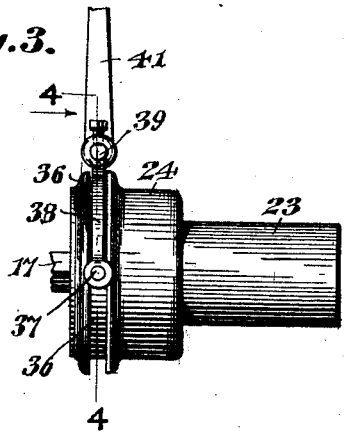
Figure 3 is a side elevation of the main or outer shifting sleeve of the improved device.
Figure 4:
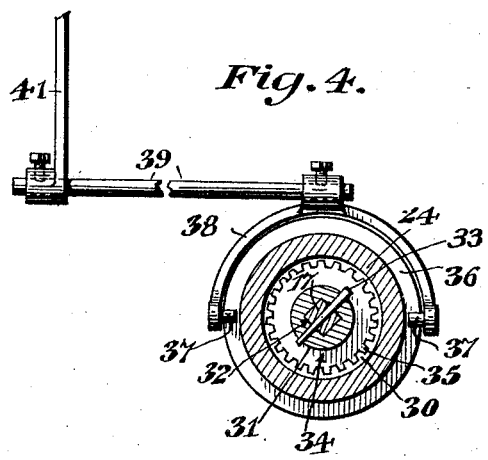
Figure 4 is a transverse section on the line 4—4 of Fig. 3 looking in the direction of the arrow.
Figure 5:
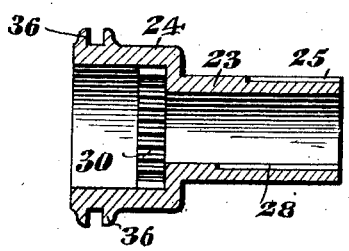
Figure 5 is a longitudinal section of the part shown in Fig. 3 without the shipper lever.
Figure 6:
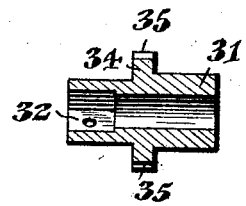
Figure 6 is a longitudinal section of the inner coupling sleeve.
Figure 7:
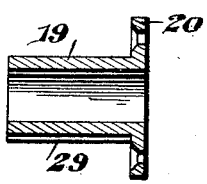
Figure 7 is a longitudinal section of the coupling member, detached.
Figure 8:
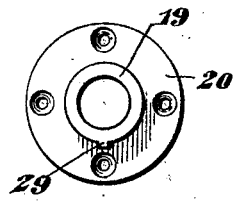
Figure 8 is an end elevation of the member shown in Fig. 7.

The improved device may be applied without material structural change to the drive mechanism of motor driven vehicles of various makes, and it is not desired to limit the improved device to any specific construction of motor, but for the purpose of illustration is shown applied to a conventional construction of an apparatus of this class, in which 10 represents a portion of the engine casing, and 11 the transmission gearing including the foot levers 12. In the improved apparatus the drive shaft is divided, one part, indicated at 13, leading from the engine casing and through the transmission gearing, and another part 14 leading to the differential gearing, not shown. A universal joint, represented conventionally at 15, is coupled in the shaft section 14, and the part of the latter between the coupling 15 and the shaft section 13 is of other form than round, for instance square as shown at 17.

The outer terminal of the shaft section 13 is reduced as at 18, and bearing over the reduced portion is a coupling member 19 having an attaching flange 20 to provide means for connecting the coupling member to the adjacent portion of the casing 21 of the transmission gearing 11 as shown at 22.

Slidably disposed over the coupling member 19 is a relatively long sleeve or shell formed of a small portion 23 and a larger portion 24. The portion 23 is slidable over the coupling member 19, and is provided with a keyway 25 in which a key or spline 26 in the shipping collar 27 of the transmission gearing engages, so that the sleeve 23—24 will be rotative with the shipper collar and also slidable there-through.

The smaller portion 23 of the sleeve is formed with a keyway 28 in which a key or spline 29 on the coupling member 19 engages to slidably couple the members 23—24 and 19.

Formed within the larger part 24 of the sleeve is a plurality of inwardly directed teeth 30.

Slidably disposed within the smaller portion 23 of the sleeve is a collar 31 having a socket 32 conforming to and adapted to receive the irregular terminal 17 of the shaft section 14, so that the shaft section and collar revolve together. The parts 17 and 31 are further connected by a transverse pin 33, to prevent longitudinal displacement. The member 31 is provided with an annular flange 34 having teeth 35 adapted to be engaged by the teeth 30 of the sleeve 23—24, when the sleeve is in one position, and to be disengaged therefrom when the sleeve is in another position.

The portion 24 of the sleeve is formed with spaced annular ribs 36 to receive the studs 37 of a shipper yoke 38, the latter connected to a rock shaft 39. The rock shaft is mounted for rotation in the transmission casing 40, and is provided with an operating lever 41, the latter having a holding pawl 42 operating over a notched segment 43, attached to the deck 45 of the vehicle.

By this means, the sleeve 23—24 may be moved longitudinally of the collar 31 and the coupling member 19, to disconnect the teeth 30 of the sleeve from the teeth 35 of the collar 31, to instantly disconnect the shaft section 14 from the shaft section 13. A spring 44 is disposed between the portion 24 of the sleeve and the adjacent shipper ring 27 of the transmission gearing, to yieldably retain the sleeve at one end of its movement.

By this simple means the driving mechanism of the motor can be instantly disconnected from the driving mechanism of the rear axle, when occasion requires.

The preferred embodiment of the invention is disclosed in the drawings and set forth in the specification, but it will be understood that modifications within the scope of the claimed invention may be made in the construction without departing from the principle of the invention or sacrificing any of its advantages.

Having thus described the invention, what is claimed as new is:—

In a clutch mechanism, a shell member having internal teeth and a longitudinal internal guideway, an external longitudinal guide channel and an internal longitudinal guide channel, a holding member having a guide rib engaging in the internal guide channel of the shell, a clutch member having a guide portion engaging in the guideway of the shell and a plurality of teeth adapted to co-act with the teeth of the shell, a shipper collar slidable on the shell and adapted to actuate transmission mechanism, said collar having a guide rib movably engaging the external guide channel of the shell, means for adjusting the shell longitudinally of the clutch member to couple and uncouple the teeth, and means for independently adjusting the shipper collar longitudinally of the shell.

In testimony whereof, I affix my signature hereto.

WAYNE L. HAINES.